United States Patent

[11] 3,629,857

[72] Inventor Ulbe Faber
Honeybrook, Pa.

[21] Appl. No. 859,139
[22] Filed Sept. 18, 1969
[45] Patented Dec. 21, 1971
[73] Assignee Burroughs Corporation
Detroit, Mich.

[54] COMPUTER INPUT BUFFER MEMORY INCLUDING FIRST IN-FIRST OUT AND FIRST IN-LAST OUT MODES
12 Claims, 6 Drawing Figs.

[52] U.S. Cl. .......... 340/172.5
[51] Int. Cl. .......... G11c 7/00
[50] Field of Search .......... 340/174, 172.5

[56] References Cited

UNITED STATES PATENTS

| | | | |
|---|---|---|---|
| 3,200,379 | 8/1965 | King et al. | 340/172.5 |
| 3,234,524 | 2/1966 | Ruth | 340/172.5 |
| 3,274,566 | 9/1966 | McGrogan, Jr. | 740/172.5 |
| 3,289,171 | 11/1966 | Scherr et al. | 340/172.5 |
| 3,374,467 | 3/1968 | Cast et al. | 340/172.5 |
| 3,513,448 | 5/1970 | Armstrong | 340/172.5 |
| 3,518,631 | 6/1970 | Lindquist et al. | 340/172.5 |
| 3,292,153 | 12/1966 | Barton et al. | 340/172.5 |

OTHER REFERENCES

IBM. Disclosure Bulletin, Vol. 9, No. 10, March 1967, page 1334– 1335, First-In First-Out Buffer Controls by Dales and Mizzi

*Primary Examiner*—Gareth D. Shaw
*Assistant Examiner*—Paul R. Woods
*Attorney*—Carl Fissell, Jr.

ABSTRACT: This disclosure relates to a memory or storage array that can be accessed randomly and also in both a first in-first out mode and a first in-last out mode. The array is word oriented and each word location is provided with an indicator flip-flop which is placed in a ONE state when a word has been entered therein, the flip-flop being reset to ZERO when the word has been fetched from that location in a nonrandom access mode. Address logic is provided to select the next successive location in one of the fetching modes having the same sequence as the storage mode. In addition, the address logic provides for selecting locations in an opposite sequence and for selecting locations in a random manner during the other fetching modes.

INVENTOR.
ULBE FABER
BY
ATTORNEY

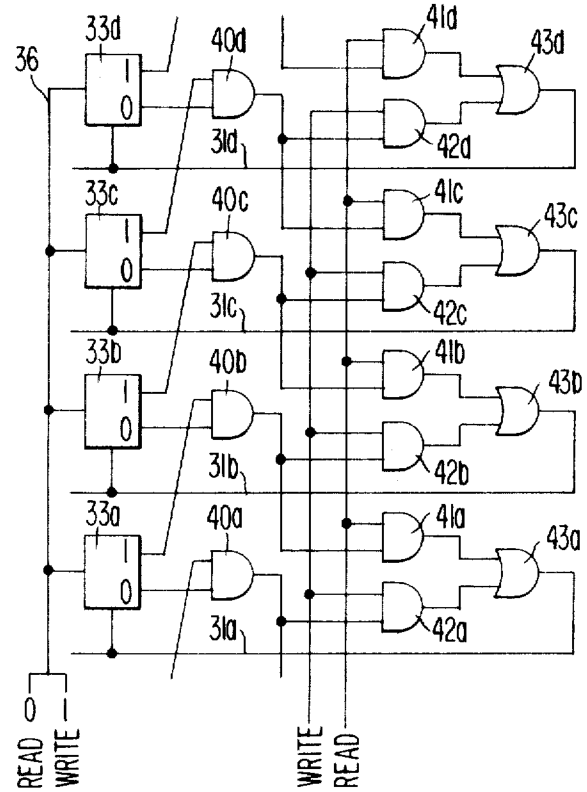
Fig. 3
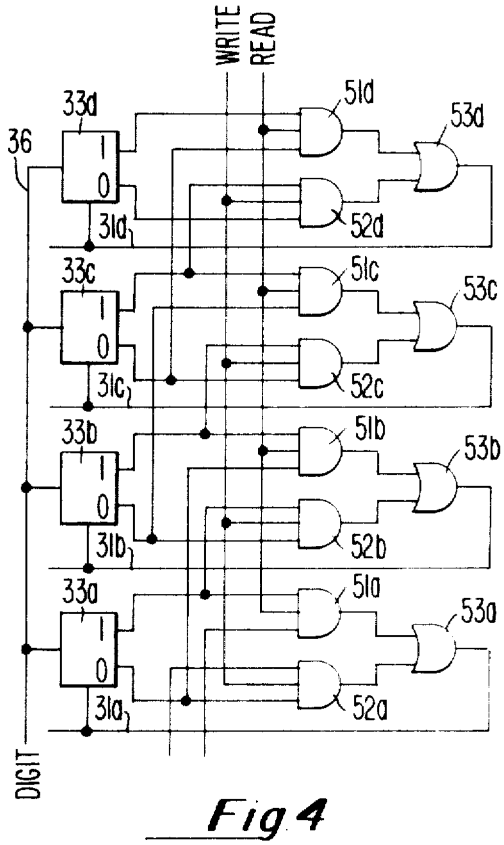
Fig. 4
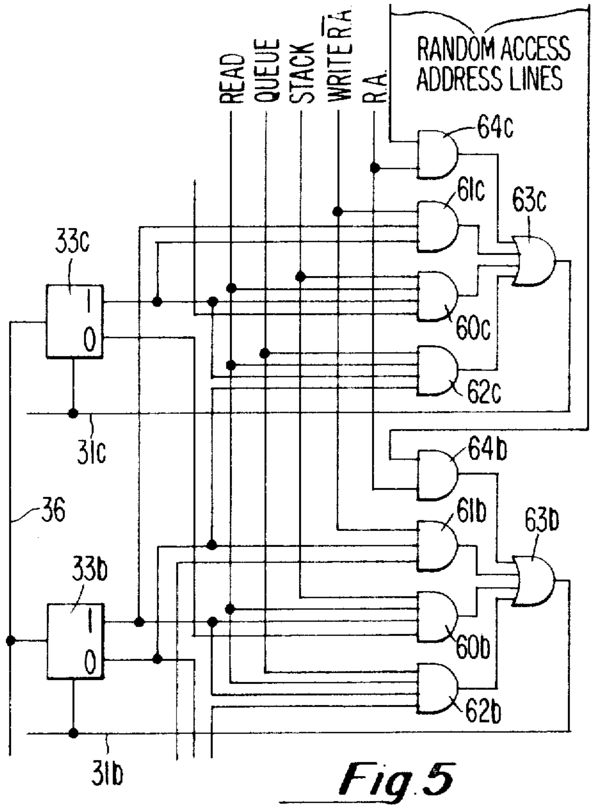
Fig. 5
| WORD LOCATION | INDICATOR STATE | |
|---|---|---|
| n+4 | 0 | ← NEXT LOCATION FOR STORAGE |
| n+3 | 1 | ← NEXT LOCATION FOR STACK FETCH |
| n+2 | 1 | |
| n+1 | 1 | ← NEXT LOCATION FOR QUEUE FETCH |
| n | 0 | |
Fig. 6
INVENTOR.
ULBE FABER
BY [signature]
ATTORNEY

COMPUTER INPUT BUFFER MEMORY INCLUDING FIRST IN-FIRST OUT AND FIRST IN-LAST OUT MODES

BACKGROUND OF THE INVENTION

This invention relates to a memory employed as an input to the processing element of a data processing system and more particularly to such a buffer memory which may be addressed in a number of different modes including sequential addressing and random addressing.

With the advent of large scale integrated circuitry and other improvements in computer components, faster instruction cycles are being obtained for large, medium and even small data processing systems. With the increase in the speed of instruction execution, there must also be an increase in the data transfer rates as well as the instruction transfer rates between the main memory and the processing element of the system. In the case of instruction transfer to the processing element, certain instructions are of a conditional nature such that additional instructions would be required before the execution of an earlier instruction can be completed. In such situations, it is desirable to have a buffer element from which instructions can be transferred either sequentially or randomly. Sequential transfer is advantageous in that significant additional time is not required for each address generation.

A particular example of the processing element for which the present invention is adapted is disclosed in the Faber et al. patent application, Ser. No. 825,569, filed May 19, 1969 and assigned to the same assignee as the present application. In that application, there is disclosed a programmable unit employing plural levels of subinstructions sets thereby providing a greater order of versatility in carrying out various algorithmic sequences. This versatility is achieved without the requirement of specific hard wire circuitry for each algorithmic sequence and also without requiring the programmer to specify each individual step of the sequence.

As further illustrated in that application, the ability to execute conditional subinstructions or conditional microinstructions is provided in order to increase the flexiblity of the system. In such a system, should the execution of a particular subinstruction first require the execution of another subinstruction, the first execution would be delayed while the second instruction was fetched and executed. Under other circumstances, a string of such microinstructions would be executed in the normal sequential manner.

A particular problem encountered in the implementation of such a system is one where the storage cycle of the memory is not sufficiently fast to accommodate the transfer of a plurality of such instructions in sufficient time to meet the requirements of the processing element. This is particularly true when the instructions are microinstructions even though the microinstruction memory was provided with a shorter cycle time. To overcome this problem, a plurality of buffer registers are provided which are loaded with the respective instructions at some time prior to the time they are required for execution. However, such buffer memories have normally been of a sequential nature such that once the instructions were loaded into the buffer, they could only be read out in a sequential manner. With such sequential buffers, the execution of conditional instructions cannot be delayed pending the execution of some other instruction.

Prior art buffering devices provide many different modes of sequential and random addressing. Standard prior art devices are normally referred to as pushdown stacks, pulldown stacks, and queues. Such devices, of course, are employed in many different types of units in a data processing system for the purpose of data and instruction arranging. Their employment is not limited to just that of a buffer the main purpose of which is to correct for lack of synchronization between different data transfer rates or to correct for a mismatch in the widths of data or instruction segments. The two sequential manners provided by such devices for the storing and fetching of data and instructions are (1) first in-first out and (2) first in-last out.

Of course, any random access memory array or any array of any independently addressable registers can be programmed to provide these functions. However, this approach places an extra burden on the programmer and, therefore, it is desirable that these respective functions be implemented in logic circuitry. When the respective manners of addressing are fixed in circuitry, then sufficient flexibility is not available to accommodate the transfer of a set of instructions certain of which may be conditional as was described above.

It is, therefore, an object of the present invention to provide an improved buffer memory for employment in a data processing system.

It is another object of the present invention to provide an improved buffer memory for employment in the transfer of sets of instructions certain of which may be conditional instructions.

It is still another object of the present invention to provide an improved memory array that may be addressed in a plurality of different manners.

It is still another object of the present invention to provide an improved array of storage locations or registers that may be addressed in a random manner, a first in-first out manner, or a first in-last out manner.

SUMMARY OF THE INVENTION

As distinct from certain prior art pushdown and pulldown stacks and the like, in which successive data segments are actually shifted or transferred from one storage location to the successive location, the present invention employs the technique of entering the respective information segments into each successive location or register. When a plurality of such segments are desired to be fetched or read out in a first in-first out sequential mode, the respective registers or locations are accessed in the same sequence in which the respective information segments were stored therein. Conversely, when it is desired to operate the array in a first in-last out mode, the respective storage locations or the registers are accessed in a sequence opposite to the sequence in which the segments were stored. In addition, the array of storage locations or registers are adapted to be accessed randomly should different arrangements of segment sequences be required.

To this end, and in order to accomplish the various objects of the present invention, an array of storage locations is provided with a plurality of indicator flip-flops, one for each storage location. When an information segment has been read out of a particular storage location, its respective flip-flop will be placed in a ZERO state and when an information segment has been stored in a particular storage location, its respective flip-flop will be placed in a ONE state. Logic circuitry is provided to detect the conditions of the various flip-flops in relation to their neighboring location flip-flops. Thus, when it is desired to enter a sequence of information segments into the array, the first segment will be entered into that register or location whose indicating flip-flop is ZERO where the previous location indicator is a ONE. In this manner, the sequence of information segments will be entered into successive neighboring storage locations. When it is desired to fetch successive information segments in a first in-first out manner, the segments will be retrieved in the same sequence as they were entered into the memory array. That is to say, the first segment will be retrieved from the first storage location or register whose indicating flip-flop is then set to ZERO and each succeeding fetch will be from that storage location or register whose indicating flip-flop is a ONE where the previous indicator flip-flop is a ZERO. When it is desired to fetch the sequence of information from the array in a first in-last out manner, the read out will be in a sequence opposite to that in which the segments were entered into the memory. Thus, the first segment will be fetched from the last register or memory location whose indicating flip-flop is then set to ZERO and each succeeding fetch will be from that memory location or register whose indicator flip-flop has been set to ONE where the next succeeding indicating flip-flop is a ZERO. In addition, the address logic circuitry is adapted to provide random access addressing to the storage array.

A feature then of the present invention resides in an array of storage locations or registers each of which is provided with a two state indicator to indicate whether information has been entered into or retrieved from that particular storage location with further provisions being made for logic circuit means to determine the respective states of each indicator and its neighboring location indicator. A mode signal source is provided to condition the logic circuitry to select or read out that storage location or register whose indicator is in a ONE state and the indicator for the next lower numbered location is in a ZERO state.

Another feature of the present invention resides in the adaptation of the logic circuitry to respond to the mode signals or to select for readout that storage location or register, the indicator for which is in a ONE state where the indicator for the next higher numbered storage location or register is in a ZERO state.

Still another feature of the present invention resides in the provision of an address register where the logic circuitry is adapted to select any individual storage location or register in accordance with an address supplied to the address register.

With the present invention, then, any sequence of information segments or words can be entered into the storage array and subsequently retrieved in the same sequence or in the opposite sequence. Furthermore, any one particular information segment or word can be retrieved out of sequence.

DESCRIPTION OF THE DRAWINGS

The above and other objects, advantages and features of the present invention will become more readily apparent from a review of the specification when taken in conjunction with the drawings wherein:

FIG. 3 is a schematic representation of the logic circuitry of the present invention as adapted to provide for one particular mode of sequential accessing;

FIG. 4 is a schematic representation of the logic circuitry of the present invention as adapted to provide for another mode of sequential accessing;

FIG. 5 is a schematic representation of the logic circuitry of the present invention as adapted to provide the functions of the circuits of FIGS. 3 and 4 as well as to provide for random accessing of the storage array; and FIG. 6 is a table illustrating the operation of the present invention.

GENERAL DESCRIPTION OF THE INPUT BUFFER

Figure 1:
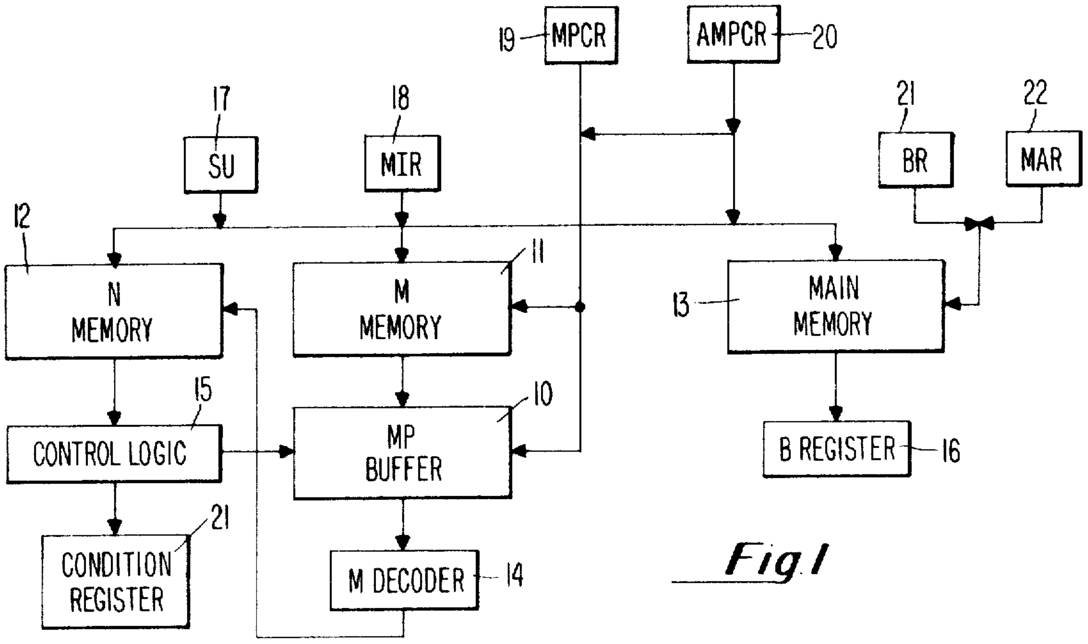
FIG. 1 is a schematic representation illustrating a memory-processor interface in which the memory buffer of the present invention resides.

While the memory buffer of the present invention may be employed in any memory-processor interface, it is particularly adapted for employment in a microprogrammed system such as described in the above-referred-to Faber et al. application. A particular feature of the system as described therein is that the respective microinstructions are interpreted or decoded by a still lower level of subinstructions so that the significance of particular microinstructions can be changed for different applications. Specific advantages which arise from a system of this type is that microinstructions can be executed in an overlapped manner so that certain types of microinstructions can be conditional in nature which execution can be delayed pending the testing of the respective conditions and alternative microinstructions can be fetched pending the outcome of such tests. This system then allows for branching within the microprogram. As in other microprogram systems, a macroinstruction is executed by the execution of a string of microinstructions each of which specify some data transfer from one register to another, a logic operation and the like. In the above-referred-to Faber et al. system, each microinstruction is in turn implemented by a set of control signals to set the respective gates as required for the information transfer which control signals are selected from a control memory and thus may be dynamically altered. The microinstructions, then, specify memory and device operations, logic operations including data shifts and also can contain literal information required for the execution of other microinstructions.

In the Faber et al. system, there are 16 testable conditions exactly one of which must be tested for each microinstruction. If the test is successful the entire instruction will be executed and the true successor is taken as the next microinstruction in the microinstruction sequence. If the test fails only the unconditional portions of the microinstruction will be executed.

Depending upon the conditions specified by the condition register of the processor, the microinstructions in the buffer of the present invention will be sequenced in order. Should there be a condition test which fails resulting in the requirement of a fetch for a new instruction, the new instruction will be fetched out of sequence by the processor. There are six choices for the processor to make should a condition test fail, not including the choice of fetching the next instruction in sequence. The six choices are: skip the next instruction (this operation permits one instruction conditional branch, the next instruction address is the present instruction address plus two) repeat the instruction again (this operation permits the repeated execution until the value of a condition changes at which time the next instruction address will be that of the next instruction in sequence), save loop address (this causes the address of the current instruction to be saved in a special register so that jumps can later be made to the present instruction address plus one), execute an instruction out of sequence (this operation permits an instruction specified in another register to be executed with immediate return to the normal sequencing), call a procedure (this operation causes a jump to a routine specified in the special register with the current position saved for later return) and jump (this operation permits transfer of control to the instruction specified in the special register).

To better understand the environment in which the buffer of the present invention resides, reference will now be made to FIG. 1 which illustrates the interface between the processor and the respective memories as well as with other processors and control units which might be included within the system.

As shown in FIG. 1, a data processing system which might employ the present invention is provided with three separate memories including main memory 13, a first level of subinstruction or M instruction memory 11, and a second level subinstruction or N instruction memory 12. Main memory 13 serves to provide data and macroinstructions to input register 16 of the system processor. M memory 11 serves to provide microinstruction strings to the processor by way of microprogram buffer 10. Such M instruction strings are retrieved in accordance to the execution of a macroinstruction by the processor and each of the microinstructions is retrieved from MP buffer 10 in sequence for execution by M decoder 14. In response to the decoding of an M instruction, an N instruction is retrieved from N memory 12 and placed in the control logic 15.

N memory 12 is addressed by the M decoder 14. M memory 11 is addressed by either microprogram count register 19 or the alternate microprogram count register 20. Main memory 13 is addressed either by memory address register 22 or base register 21. All of these registers are located within the processor of the system.

In addition, microprogram buffer 10 may be addressed either by microprogram count register 19 or the alternate microprogram count register 20 when a microinstruction is required to be fetched out of sequence. Otherwise, the selections from microprogram buffer 10 are made in sequence in response to signals from control logic 15 and dependent upon certain conditional signals which exist in condition register 21.

Data and other information such as instructions strings may be supplied to any one of the three memories from processor by way of memory information register 18 or the alternate microprogram count register 20. In addition, information may be supplied to any one of the three memories by way of switching unit 17 to which peripheral devices and other processors in the system may be connected.

As indicated in FIG. 1, microprogram buffer 10 serves to receive strings or blocks of microinstructions from M memory 11 for delivery in sequence to the processor which microinstructions may nevertheless be taken out of sequence in accordance with conditions which exist within the processor.

Figure 2:
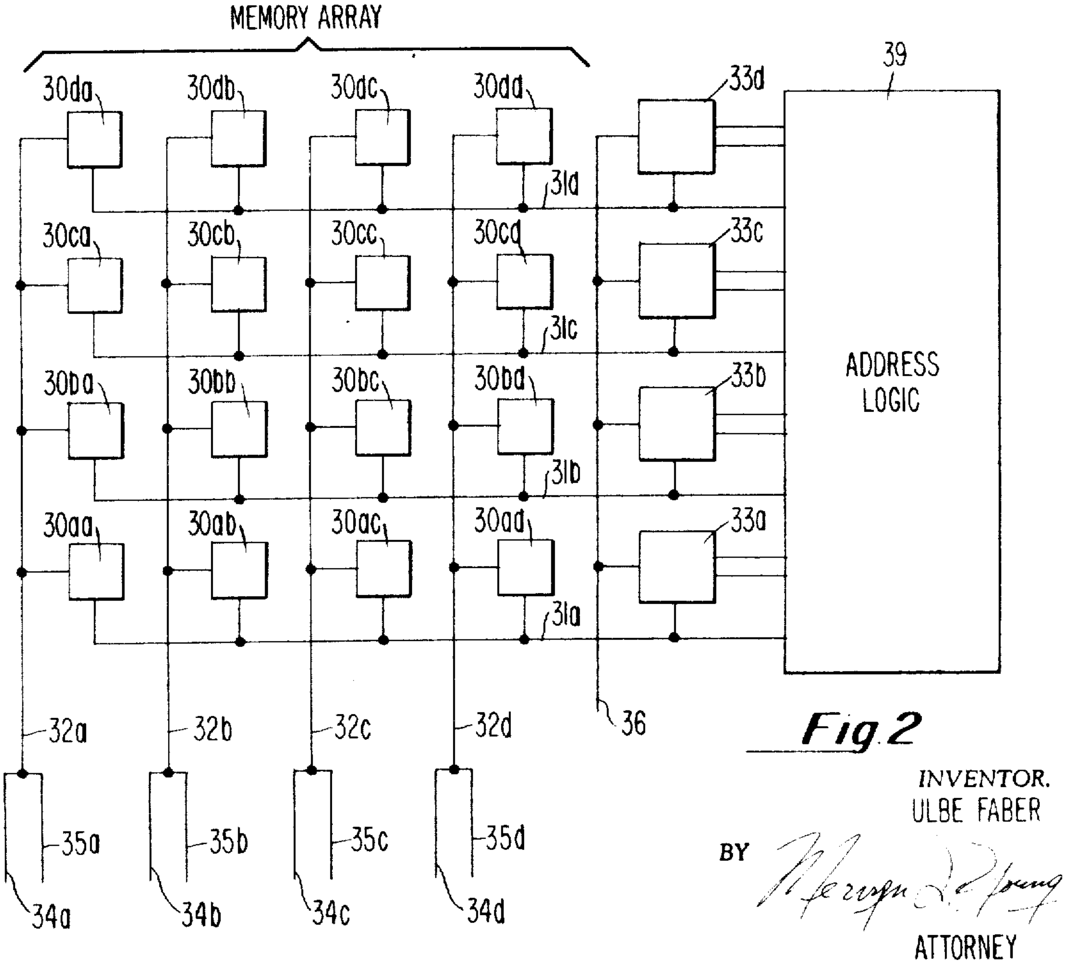
FIG. 2 is a schematic representation of the storage array of the present invention.

Referring to FIG. 2, the general features of the buffer memory 10 will now be described. In FIG. 2 there is shown as array of memory elements *30aa*,...,*30ad*; *30ba*,...,*30bd*; *30ca*,...,*30cdda*, ..., *30dd*. This array has been illustrated as being a 4 by 4 array; however, it will be appreciated that the array can be expanded to any number of rows and columns. The array has further been illustrated as a word oriented memory. That is to say, each of the respective series or rows of elements are associated with corresponding work lines *31a*,...*31d*. While the array is preferably formed of a series of thin film locations, it will be understood that the present invention can be equally adapted to an array of magnetic cores, flip-flops or any other bistable devices.

The respective word lines *31a*,...,*31d* are employed in conjunction with the respective sense-digit lines *32a*,...,*32d* to read and write into the respective locations. When it is desired to write into a particular word location, the respective sense-digit lines *32a*,...,*32d* are activated by an appropriate write signal from digit lines *34a*,...,*34d* in coincidence with a selected one of the word lines *31a*,...,*31d* to switch the respective memory elements associated with that word location or row. When it is desired to read out of a particular word location, a selected one of the word lines *31a*,...,*31d* is activated, the memory elements associated with that word line are switched and the resultant sensed signals are read out on the respective sense lines *35a*,...,*35d* by way of the respective sense-digit lines *32a*,...,*32d*. The digit drivers (not shown) and the respective sense amplifiers (not shown) are provided with an appropriate isolation means well known in the art such that the sense amplifiers will be disconnected from the circuitry at the time the digit drivers are activated.

The memory array of FIG. 2, as thus described, is a standard word oriented array. The manner in which this array is adapted for the purpose of the present invention will now be described. As illustrated in FIG. 2, there is provided, in addition to the array of memory elements, a plurality of flip-flops *33a*,...,*33d* each of which is associated with and connected to a corresponding word line *31a*,...,*31d*. In addition, each of the respective flip-flops is connected to read-write line 36. When a positive signal is applied to read-write line 36 in coincidence with a positive signal on one of the word lines *31a*,...,*31d*, the flip-flop associated with that word line will be set to its ONE state. Conversely, when a positive signal appears on any one of the respective word lines *31a*,...,*31d* and there is no positive signal on read-write line 36, the flip-flop associated with that word line will be reset to its ZERO state. Thus, each of the respective flip-flops *33a*,...,*33d* will indicate the status of its corresponding word location. If a word has been written into that location then the corresponding flip-flop will be set to its ONE state and if a word has been read out of a particular word location the corresponding flip-flop will be set to the ZERO state. The status of the respective word location flip-flops is signalled to address logic 39 as indicated in FIG. 2 which information is then employed by logic 39 in each of the respective modes of operation of the present invention, namely, first in-first out mode, first in-last out mode and the random access mode.

The address logic for two adjacent word locations is illustrated in FIG. 5. This logic is the composite of circuitry to implement the three different modes of operation. Before describing the circuitry of FIG. 5, reference will first be made to FIGS. 3 and 4 which illustrate the circuitry required to implement the first in-last out mode of operation and the first in-first out mode of operation respectively.

The operation of the circuitry of FIG. 3 will be described primarily in reference to flip-flops *33b* and *33c* which are respectively associated with word lines *31b* and *31c*. Flip-flops *33b* and *33c* as well as the other flip-flops employed in the logic are of the type having two output leads such that a signal present on one of the leads will indicate that the flip-flop is in its ONE state while a signal will be presented on the other lead when the flip-flop is in its ZERO state. As illustrated in FIG. 3, the ONE-state lead of flip-flop *33b* is connected to AND-gate *40c* associated with word line *31c*, that is the word line having the next higher address. The ZERO-state lead of flip-flop *33b* is connected to AND-gate *40b* which also received a ONE-state signal from the next lower order flip-flop. A ZERO-state lead from flip-flop *33c* is correspondingly connected to AND-gate 40 *c*. Thus, AND-gate *40b* or any other similar AND gate will present an output signal when its corresponding flip-flop *33b* resides in the ZERO state but the next lower order flip-flop resides in the ONE state. This signal is in turn supplied to AND-gate *42b* and to AND-gate *41a* which respectively receive the write and read signals which are generated at clock time. Thus, when AND-gate *40b* is providing an output signal and a write signal is received, AND-gate *42b* will provide an output signal through OR-gate *43b* to activate word line *31b*. Conversely, if a read signal is provided at clock time, then the output signal of AND-gate *40b* will be gated through AND-gate *41a* and OR-gate *43a* to activate word line *31a*. In this manner, a particular word line is activated at read time when its corresponding flip-flop is in a ONE state and the next higher ordered flip-flop is in a ZERO state while the same word line would be activated at write time when its corresponding flip-flop is in a ZERO state and the next lower ordered flip-flop is in a ONE state. Thus, the order in which the respective word locations are read out is just opposite to the order in which information is entered into each of the word locations. It will be remembered from above that every time a word location is read out, its corresponding flip-flop is reset to the ZERO state while that flip-flop is placed in the ONE state at the time data is entered into that word location.

As distinct from FIG. 3, FIG. 4 illustrates logic by which word locations are read out in the same order in which data is entered into those word locations. In FIG. 4, the states of the neighboring ones of the respective flip-flops *33a*,...,*33d* are compared by the address logic to ascertain the last location into which information was stored or fetched so that the next higher address location can then be accessed for storing or fetching. These occurrences will be again described with reference to flip-flops *33b* and *33c*. It will be remembered that when a particular word location is written into its corresponding flip-flop is placed in the ONE state and that flip-flop is placed in the ZERO state when that location has been read out. Thus, when flip-flop *33b* resides in the ONE state, flip-flop *33c* resides in a ZERO state, and a write signal appears on the write line at clock time, that signal will be gated through AND-gate *52c* and OR-gate *53c* to activate word line *31c*. Conversely, when flip-flop *33b* is in the ZERO state, flip-flop *33c* is in the ONE state, and a read signal appears on the read line at clock time, this signal will be gated through AND-gate *51c* and OR-gate *53c* to activate word line *31c*. When writing into any array of this type, each of the respective flip-flops will be in the ZERO state and each successive flip-flop will be set to ONE as an information segment is entered into it. Conversely, in reading out from the array, each of the respective flip-flops will be in the ONE state and each successive flip-flop will be reset to the ZERO state as a word is read out therefrom. With the logic as illustrated in FIG. 4, the sequence of reading out will be the same as the sequence of writing in.

Referring now to FIG. 5, logic circuitry will now be described which combines the functions of the circuitry of FIGS. 3 and 4 as well as provide for random access addressing. The various modes of operation are again dependent upon the respective states of adjacent word location flip-flops. In FIG. 5, the word location flip-flops which are to be described for purpose of illustration are again flip-flops 33*b* and 33*c*.

The logic shown in FIG. 5 serves to gate timing signals to select the respective word locations at different clock times. These timing signals are: random access read, write, and read. In addition, signals are supplied to the logic to indicate whether the logic is to operate in the queue mode or stack mode. For the purposes of this disclosure, the queue mode is defined as first in-first out and the stack mode is defined as the first in-last out mode. When the logic is to operate in the random access mode, a particular address signal will be supplied to one of the respective AND-gates 64*c* or 64*b* to condition that AND gate to transmit the clock signal by way of either OR-gate 63*c* or OR-gate 63*b* to select the respective word line 31*c* or 31*b* as a result of which the individual memory elements coupled to that word line will be read out as has been described above.

When it is desired to write into one or more word locations, the location to be written into will be selected as was described above in reference to both FIGS. 3 and 4. In FIG. 5, the word location corresponding to word line 31*c* will be selected upon the activation of word line 31*c* and OR-gate 63*c*. As explained and illustrated in FIG. 5, this condition will exist when flip-flop 33*b* is in a ONE state and flip-flop 33*c* is in a ZERO state. That is to say, that the next location to be written into will be that one whose word location flip-flop is in a ZERO state with the preceding word location flip-flop being in the ONE state. It will be remembered that in writing into the various bit locations of a given work, the signal on the corresponding word line acts in coincidence with the respective digit lines for each column of memory elements to set the corresponding memory element in a ZERO or ONE state depending upon whether there is a positive signal on this corresponding digit line.

When it is desired to read out of the buffer memory of the present invention in a first in-first out mode, the queue line to the logic will be activated. For example, if it is required to read out of the word location corresponding to word line 31*c*, the read signal at clock time will be gated through AND-gate 62*c* or OR-gate 63*c* when flip-flop 33*c* is in a ONE state, flip-flop 33*b* is in a ZERO state and there is the presence of the queue mode signal. In this sense, the function of the circuitry of FIG. 5 is exactly the same as the functioning of the circuitry of FIG. 4 described above.

When it is required to read out of the memory buffer of the present invention in a first in-last out manner, the read signal occurring at clock time will be gated, for example, through AND-gate 60*b* and OR-gate 63*b* to activate word line 31*b* when flip-flop 33*c* is in a ZERO state and flip-flop 33*b* is in a ONE state and the stack mode signal is present. While the circuitry of FIG. 5 differs somewhat from that of FIG. 3, the respective functions are the same as that described in relation to FIG. 3.

For convenience, the reader is now referred to FIG. 6 which is a table representing a particular set of indicator states for a contiguous set of word locations *n*,...,*n*+4. These states are illustrated as being 0,1,1,1,0 respectively. According to the convention employed in the address logic, the next location to be addressed for storage is location *n*+4 since its indicated state is ZERO and the indicator state of the preceding location *n*+3 is ONE. Similarly, the next location for a queue fetch is location *n*+1 since its indicator state is ONE and the next preceding location *n* has an indicator state of ZERO. The next location for a stack fetch is location *n*+3 since its indicator state is ONE and the next succeeding location *n*+4 has an indicator state of ZERO. It will be remembered that a ZERO indicates an empty location while a ONE indicates a filled location.

Although, it has not been so indicated in FIG. 5, the address logic for the first and last locations of the array will be provided with appropriate signals simulating different states for nonexistent lower and higher address locations respectively. For example, if no entry has been made in the buffer memory of the present invention, all of the indicator flip-flops will reside in a ZERO state. When the write signal is supplied to address logic 39, a positive signal will be supplied to AND-gate 61*a* (not shown in FIG. 5) to simulate the next lower location flip-flop as residing in a ONE state. When all locations are filled and a read signal and queue mode signal are supplied to logic 39, a positive signal will be supplied to AND-gate 62*a* to simulate the next lower flip-flop as residing in a ZERO state. When all locations are filled and a read stack mode is employed, a positive signal will be supplied to AND-gate 60*n* (not shown in FIG. 5) of the last word location to simulate the next higher but nonexistent indicator flip-flop as being in a ZERO state.

With the present invention as thus described, a string of instructions can be retrieved from M memory 11 (as indicated in FIG. 1) and stored in sequence in MP buffer 10 which employs the present invention. As instructions are required to be fetched and transmitted to M decoder 14, MP buffer 10 will be accessed by control logic 15 in either a stack mode or a queue mode, i.e., either a first in-last out mode or first in-first out mode respectively. If a particular fetched instruction is conditional and requires another instruction to be fetched out of sequence, this will be indicated by control logic 15 and the next instruction to be fetched from MP buffer 10 will be fetched from that location specified by microprogram count register 19.

While the above description has been about the present invention as employed as a microprogram buffer, it will be understood that the present invention can be employed in any environment in which a stack, a queue or a random access memory is required. In the latter situation, the present invention can be adapted for random access store as well as for random access fetching. Random access storage is achieved by writing into the array of FIG. 2 in the normal manner with the exception that the write R.A. line of FIG. 6 is disabled and the word location is selected by activating the R.A. line and the respective random access address line of FIG. 6.

Furthermore, nondestructive readout (NDRO) in a random manner can be achieved by implementing the present invention to rewrite into the particular word location each time that location has been randomly accessed for fetching. Where NDRO is not required, it is still desirable to inhibit resetting of the word location flip-flop upon readout in order to maintain the desired order of indicator states as required for the various sequential modes of readout. This inhibiting is achieved by activation of digit line 36 of FIG. 6 during the random access mode.

While only one embodiment of the present invention has been described and illustrated, it will be apparent to those skilled in the art that changes and modifications made be made without departing from the spirit and scope of the invention as claimed.

What is claimed is:

1. In a data processing system, a storage unit comprising:

an array of storage locations;

first circuit means connected to said array to enter information segments directly into each of successive locations thereof in sequence; and second circuit means also connected to said array to retrieve said segments directly from each of said locations in a sequence opposite to that in which said segments were entered.

2. A storage unit according to claim 1 including;

a plurality of two-state indicators each of which is associated with a particular storage location to indicate whether an information segment has been entered into or retrieved from said location.

3. A storage unit according to claim 2 wherein:

said first circuit means includes means connected to said plurality of two-state indicators to detect the state of selected two-state indicators and thereby determine the sequence of two successive storage locations, the first location of which contains an information segment and the second location of which is empty and to select said second location for storage of the next incoming information segment; and said second circuit means also includes means connected to said plurality of two-state indicators to detect the state of selected two state indicators and thereby determine the sequence of two successive storage locations, the first location of which contains an information segment and the second location of which is empty and to select said first location for the next segment retrieval.

4. In a data processing system, a storage unit comprising:

an array of storage locations;

first circuit means connected to said array to enter information segments directly into each of successive locations thereof in sequence; and second circuit means also connected to said array to retrieve said segments directly from each of said locations in the same sequence in which said segments were entered.

5. A storage unit according to claim 4 including:

a plurality of two-state indicators each of which is associated with a particular storage location to indicate whether an information segment has been entered into or retrieved from said location.

6. A storage unit according to claim 5 wherein:

said first circuit means includes means connected to said plurality of two-state indicators to detect the state of selected two-state indicators and thereby determine the sequence of two successive storage locations, the first location of which contains an information segment and the second location of which is empty and to select said second location for storage of the next incoming information segment; and said second circuit means also includes means connected to said plurality of two-state indicators to detect the state of selected two-state indicators and thereby determine the sequence of two successive storage locations, the first location of which is empty and the second location of which contains an information segment and to select said second location for the next segment retrieval.

7. In a data processing system a multimode memory system comprising:

a storage unit having an array of storage locations;

a multimode selection control means connected to said storage unit;

said multimode selection control means including;

first circuit means connected to said storage unit to sequentially enter information segments directly into said storage locations when said memory system is operative in a store mode;

second circuit means connected to said storage unit to retrieve information directly from said storage locations in the same sequence when said memory system is operative in a queue mode; and third circuit means connected to said storage unit to retrieve information directly from said storage locations in an opposite sequence when said memory system is operative in a stack mode.

8. A multimode memory system according to claim 7 wherein:

said first circuit means includes means connected to said plurality of two-state indicators to detect the state of selected two-state indicators and thereby determine the sequence of two successive storage locations, the first location of which contains an information segment and the second location of which is empty and to select said second location for storage of the next incoming information segment;

said second circuit means includes means connected to said plurality of two-state indicators to detect the state of selected two-state indicators and thereby determine the sequence of two successive storage locations, the first location of which contains an information segment and the second location of which is empty and to select said first location for the next segment retrieval; and said third circuit means includes means connected to said plurality of two-state indicators to detect the state of selected two-state indicators and thereby determine the sequence of two successive storage locations, the first location of which is empty and the second location of which contains an information segment and to select said second location for the next segment retrieval.

9. The multimode memory system as set forth in claim 7 wherein said system further includes:

an address register connected to said storage unit; and fourth circuit means also connected to said storage unit to select any one of said storage locations to retrieve an information segment in accordance with an address presented to said address register.

10. The multimode memory system as set forth in claim 9 wherein said system further includes:

a plurality of two-state indicators each of which is associated with a particular storage location to indicate whether an information segment has been entered into or retrieved from said location; and means connected to said indicators to inhibit the indicator associated with a selected location from changing to a state indicating an empty location after selection of said location by said fourth circuit means.

11. The multimode memory system as set forth in claim 9 wherein said system further includes:

mode control means to select one of said first, second, third or fourth circuit means for activation to either enter or retrieve a selected information segment.

12. The multimode memory system as set forth in claim 11 wherein said system further includes:

control means connected to said first and to said fourth circuit means to inhibit said first circuit means and to activate said fourth circuit means to select any one of said storage locations for the entry of an information segment therein.

* * * * *

PO-1050
(5/69)

UNITED STATES PATENT OFFICE
CERTIFICATE OF CORRECTION

Patent No. 3,629,857 Dated Dec. 12, 1971

Inventor(s) Ulbe Faber

It is certified that error appears in the above-identified patent and that said Letters Patent are hereby corrected as shown below:

Column 7, line 23, after "31c" and before "and" on line 24, insert -- by the way of the write signal being gated through AND gate 61c --.

Signed and sealed this 15th day of August 1972.

(SEAL)
Attest:

EDWARD M. FLETCHER, JR.
Attesting Officer

ROBERT GOTTSCHALK
Commissioner of Patents